Dec. 1, 1964  J. L. HARNED ETAL  3,159,046
BALL NUT SCREW DIFFERENTIAL

Filed Oct. 15, 1962  2 Sheets-Sheet 1

INVENTORS
John L. Harned &
Keith M. Miller

BY a.M. Heiter

ATTORNEY

Dec. 1, 1964　　J. L. HARNED ETAL　　3,159,046
BALL NUT SCREW DIFFERENTIAL
Filed Oct. 15, 1962　　2 Sheets-Sheet 2
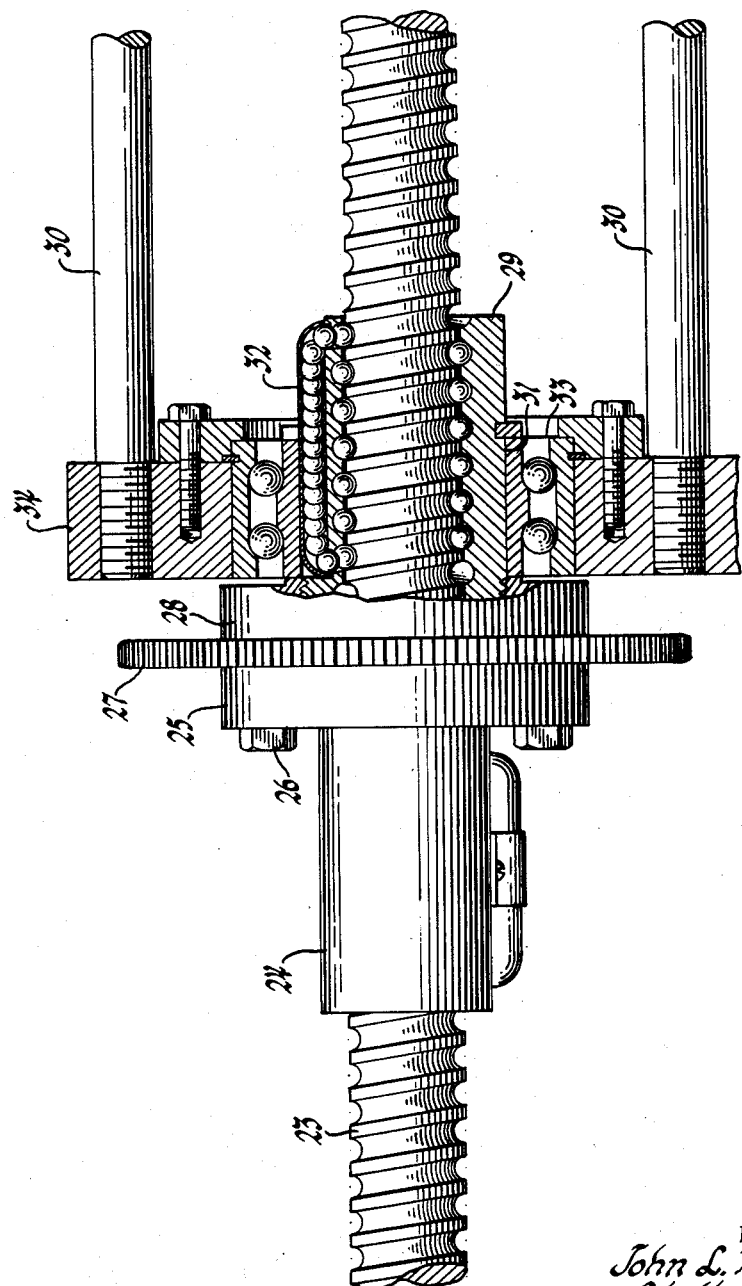

//! # United States Patent Office 3,159,046
Patented Dec. 1, 1964

3,159,046
BALL NUT SCREW DIFFERENTIAL
John L. Harned, Detroit, and Keith M. Miller, Utica, Mich., assignors to General Motors Corporation, Detroit, Mich., a corporation of Delaware
Filed Oct. 15, 1962, Ser. No. 230,603
16 Claims. (Cl. 74—424.8)

The present invention relates to a device for accurately controlling the movement and positioning of an object or load and particularly for converting the relative speed difference of two rotating shafts into a proportional linear velocity for moving and positioning a load.

A major problem which frequently occurs in machine design is to provide means for accurately and efficiently converting the relative speed difference between two rotating shafts into a proportional linear velocity. This type of problem frequently occurs in the design of machine tools, servo mechanical systems and speed synchronizing mechanisms associated with two or more separate prime movers, to name only a few.

The present invention to be disclosed embodies the use of two ball nut screw shafts mounted on support means and positioned side by side parallel to each other. A carriage assembly is mounted on the screw shafts for movement in a direction parallel to the axes of the screw shafts and has rotatably mounted recirculating ball nuts engaged by each of the screw shafts and moved thereby whenever there is a relative rotative speed difference between each of the nuts and the screw shafts. Gear mans drivingly interconnect each of the nuts and cause the carriage assembly to move at a linear speed whenever there is a relative speed difference between the rotative speeds of the two screw shafts.

In the operational set up of the present invention, the screw shafts are driven such that they have opposite rotation with respect to each other. If both shafts are rotating at equal speeds, the relative speeds between each nut and screw shaft will be zero and the carriage assembly will not move. Due to the fact that the nuts are drivingly interconnected, if the speed of one of the screw shafts is changed in respect to the other screw shaft, each nut and screw shaft will have a relative speed difference which will cause the carriage assembly to move at a linear speed proportional to the relative speed difference between the two screw shafts.

Very high screw shaft speeds which were heretofore prohibitive can now be used to obtain very small differential movement. The present invention will further provide a device having minimum backlash and compliance for applications were accurate control of a movable object or load is required. In addition the present invention will provide a device having inherently high performance characteristics which has unusual utility in the fields of application where it is desired to convert the relative speed difference of two rotating shafts into a proportional linear velocity to move a load and to accurately position a load.

An object of the invention is to provide a control mechanism for moving and locating an object having a pair of screw shafts normally driven at the same speed, and a nut on each shaft interconnected to rotate together and for coextensive linear movement operative in response to rotation of said screw shafts at differential speeds to linearly move said nuts at a speed proportional to the differential speed of the screw shafts.

Another object of the invention is to provide a device for converting the differential speed of two rotating elements into linear movement employing a pair of rotatably mounted screw shafts and a nut on each screw shaft with the nuts interconnected for rotation at the same speed and coextensive linear movement and operative in response to differential speed of said screw shafts to provide linear movement of said nuts in proportion to said differential speed.

An additional object of the invention is to provide a device for converting the differential speed of two rotating shafts into linear movement for moving and positioning an object employing a pair of rotatably mounted screw shafts and a recirculating ball nut on each screw shaft with the nuts being supported for coextensive linear movement and drivingly interconnected by gear means, said nuts operative in response to rotation of said screw shafts at different speeds to move linearly at a speed proportional to the difference in rotational speed between the screw shafts.

An additional object is to provide a device for converting the differential speed of two rotating elements into linear movement for moving and positioning an object employing a pair of rotatably mounted screw shafts and a pair of recirculating ball nuts on each screw shaft with the nuts being supported for coextensive linear movement and drivingly interconnected by gear means, said nuts operative in response to rotation of said screw shafts at different speeds to linearly move at a speed proportional to the difference in rotational speed between the screw shafts and said pair of recirculating ball nuts being mounted on said screw shafts in a manner to prevent backlash.

These and other objects of the invention will be more apparent from the following description and drawings of the preferred embodiments of the invention.

FIGURE 3 is a partial side view of one species of the differential device with parts broken away and in section to show certain details to better advantage.

Figure 1:
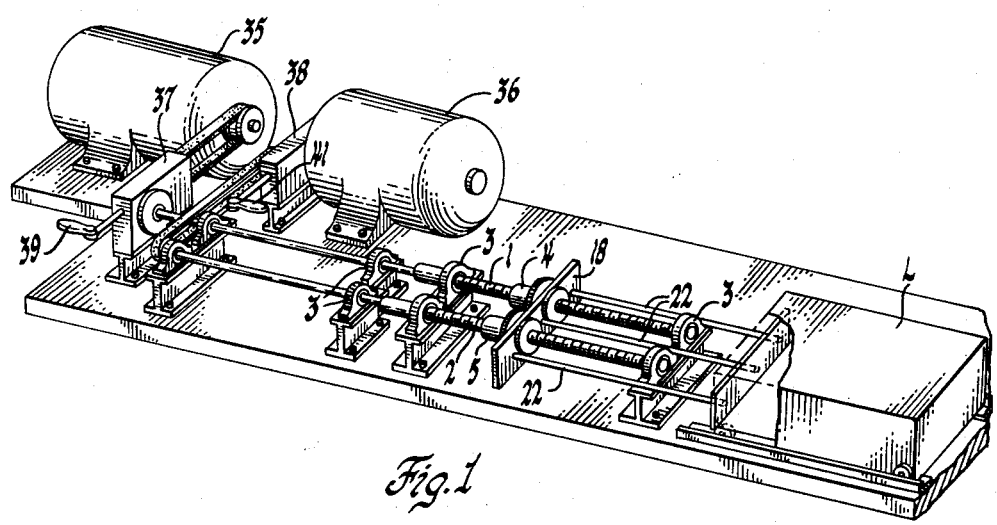
FIGURE 1 is a diagrammatic view of an application of the present invention wherein it is used in a mechanical servo actuator.
Figure 2:
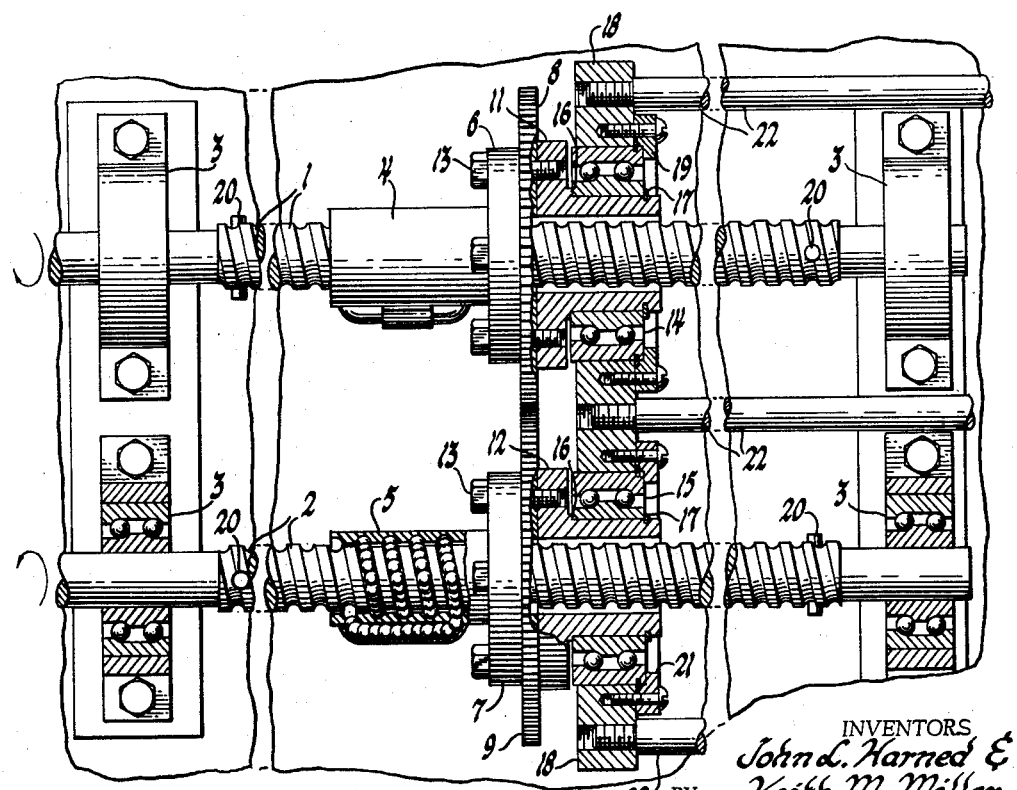
FIGURE 2 is a top plan view of the differential device with parts broken away and in section to show the various elements in detail.

Referring now to the drawings, there is best shown in FIGURE 2 a pair of ball nut screw shafts 1 and 2 mounted at each end on suitable bearing support means 3 and arranged side by side parallel to each other. Axial movement of shafts 1 and 2 is prevented by securing shafts 1 and 2 to the inner race of the bearing support means 3. Nuts or transfer devices 4 and 5 are recirculating ball nuts and are mounted on screw shafts 1 and 2 respectively to provide antifriction screw shaft engaging means. Each of the nuts 4 and 5 have a mounting flange 6 and 7 respectively. Gears 8 and 9, and bearing mounting flanges 11 and 12 are secured to the flange mountings 6 and 7 respectively by suitable securing means such as bolts 13. The gears 8 and 9 mesh with each other in the manner shown and drivingly interconnect nuts 4 and 5. Bearings 14 and 15 have their inner race mounted on the bearing mounting flanges 11 and 12 respectively and are secured in place with any suitable securing means such as the retaining shoulders 16 and snap rings 17. Bearings 14 and 15 are shown to be of the double row angular contact type although it is to be appreciated that they can be of any suitable type capable of sustaining the rotary and thrust bearing loads to be anticipated in a particular application of the present device. A housing or output member 18 is mounted on the outer race of bearings 14 and 15 and secured in place by any suitable securing means such as the snap ring and retaining rings 19 and 21. Positioning rods 22 are secured to the housing member 18 and can be connected to a movable load L such as shown in FIGURE 1. The nuts 4, 5, gears 8, 9, bearing mounting flanges 11, 12, bearings 14, 15, and housing member 18 act as an integral unit or carriage assembly and are capable of translating in a direction parallel to the axes of shafts 1 and 2. Movement of the carriage assembly is limited by suitable means such as abutment pins 20.

In operation, screw shafts 1 and 2 are driven such that they have opposite respective rotations. If both screw shafts 1 and 2 are rotating at equal speeds, the relative speed between each nut and screw shaft, nut 4 and screw shaft 1, and nut 5 and screw shaft 2, will be zero and the carriage assembly will not translate. Because the nut or transfer devices 4 and 5 are geared together by gears 8 and 9, if the speed of one of the shafts 1 and 2 is changed in respect to the other, each nut and its associated screw shaft will be caused to have a relative speed difference therebetween.

To illustrate the operational sequence of events that occurs whenever there is caused a relative rotative speed difference between screw shafts 1 and 2, assume that screw shafts 1 and 2 are initially rotating at equal speeds and in the directions indicated by the arrows in FIGURE 2. Assuming that screw shafts 1 and 2 have equal screw leads and gears 8 and 9 have equal number of gear teeth, under the above operating conditions nuts 4 and 5 are caused to be rotated in the same direction and at the same speed as their respective screw shafts 1 and 2 and the carriage assembly does not move. The carriage assembly does not move because the relative speed difference between each nut and screw shaft is zero. If the speed of screw shaft 2 is now increased and the speed of screw shaft 1 is held constant, screw shaft 2 will tend to rotate nut 5 at an increased speed and screw shaft 1 will tend to still rotate nut 4 at its same initial speed. Because nuts 5 and 4 are interconnected by gears 9 and 8 respectively what then occurs under these transitory conditions is that gear 8 will act as a reactionary member for gear 9 tending to slow gear 9 and gear 9 will act as a driving member for gear 8 tending to increase the speed of gear 8. This interplay between gears 8 and 9 will cause the gears 8 and 9 to reach a speed intermediate of the speeds of the oppositely rotating screw shafts 1 and 2. Because gears 8 and 9 are rotating at a speed intermediate of the speeds of the screw shafts 1 and 2, there is effected an identical relative speed difference between the nut 5 and screw shaft 2, and the nut 4 and screw shaft 1, which causes the carriage assembly to move to the right at a linear speed proportional to the relative speed difference between screw shafts 1 and 2.

Referring now to FIGURE 3, there is shown a species of the differential device wherein a pair of recirculating ball nuts are mounted on each screw shaft for the purpose of preventing backlash. For illustrative purposes only one recirculating ball nut and screw shaft assembly is shown and it is to be understood that a similar assembly can be mounted on the other screw shaft. A screw shaft 23 is rotatably mounted in the same manner as screw shafts 1 and 2 and has a recirculating ball nut 24 mounted thereon in the same manner as nuts 4 and 5. Nut 24 includes a mounting flange 25 having secured thereto by bolts 26 a gear member 27 and an annular member 28. Annular member 28 has an internally threaded portion for threadably receiving an external threaded end portion of a second recirculating ball nut 29. Recirculating ball nut 29 has a partial external cylindrical shape 31 with suitable ball recirculating means 32 lying within the outside diameter of nut 29 and is adapted to be received by the inner race of a bearing 33 and secured thereto. A housing 34 is suitably mounted and secured on the outer race of bearing 33 and has secured thereto positioning rods 30. By utilizing the back to back relationship of nuts 24 and 29 and a suitable spacer positioned therebetween, gear 27 in this case, the nuts 24 and 29 can be tightened together to preload the balls for the purpose of eliminating backlash between the nuts 24, 29 and the screw shaft 23. In addition to eliminating backlash there is an attendant structural improvement because there is provided added structural support for the housing 34 which is accomplished without substantially increasing the overall axial length of the members mounted on the screw shafts shown in FIGURE 2, the members referred to being nut 4, flange 6, gear 8 and flange 11 for example.

FIGURE 1 shows an application of the present invention in a mechanical servo actuator. In this instance separate constant speed prime movers 35 and 36 are indirectly connected through variable speed means 37 and 38 to rotate screw shafts 1 and 2 respectively. Each of the variable speed means 37 and 38 has manual control means 39 and 41 respectively to provide manual control for controlling the output of the variable speed means 37 and 38. By utilizing the variable speed means 37 and 38 as operative control units the movable load L can be caused to be moved and positioned in any predetermined manner by manual operation of the manual control means 39 and 41. Alternatively, instead of constant speed prime movers, variable speed motors or other suitable input means could be utilized to provide a variable speed drive for each of the screw shafts.

The present invention has been shown to be utilized in a mechanical servo actuator, however, it is to be understood that the principles involved are applicable for numerous other applications which after knowledge of the herein described invention is obtained by persons skilled in the art, will readily find adaptation in equivalent forms. Particularly noteworthy is the fact that the screw shafts can be rotated at very high speeds to get small differentials for the purpose of very accurately moving and positioning a load or an object within small increments of linear travel. Still further it has been shown that backlash can be greatly minimized by using two ball nuts on each screw that are preloaded against each other in the manner shown.

The foregoing demonstration of the rotary to linear differential device is a complete description of a working device in accordance with the present invention and it is to be expressly understood that changes may be made without departing from the spirit and scope of the invention as set forth in the appended claims.

We claim:

1. In a rotary to linear differential device; a pair of parallel elongated screw shafts; support means rotatably supporting said screw shafts and preventing axial movement thereof; input means for rotating each of the shafts; and a carriage assembly mounted on the shafts for movement in a direction parallel to the shafts including; rotatably mounted screw shaft engaging means engaging each of said screw shafts to move said carriage assembly whenever there is a relative speed difference between said engaging means and said screw shafts, and gear means operatively connecting said engaging means so that any rotative speed difference between the screw shafts causes a relative speed difference between each of said engaging means.

2. In the rotary to linear differential device set forth in claim 1, wherein said screw shafts are ball nut screw shafts and said screw shafts engaging means are recirculating ball nuts.

3. In the rotary to linear differential device set forth in claim 1, wherein said screw shafts are ball nut screw shafts and each said screw shaft engaging means are a pair of preloaded recirculating ball nuts.

4. In a rotary to linear differential device; a pair of parallel elongated shafts; support means rotatably supporting said shafts and preventing axial movement thereof; input means for rotating each of the shafts; and output means supported by the shafts for movement axially of the shafts including; first and second transfer devices rotatably mounted on said shafts, said first transfer device movable by one of said shafts in a direction axially of said one shaft whenever there is a relative speed difference between said first transfer device and said one shaft, said second transfer device movable by the other of said shafts in a direction axially of said other shaft whenever there is a relative speed difference between said second transfer device and said other shaft, and gear means carried by each of said transfer devices and in mesh with each other so that any rotative speed difference between the shafts causes a relative speed difference between each of said transfer devices and said shafts to move the output means.

5. In the rotary to linear differential device set forth in claim 4, wherein said shafts are ball nut screw shafts and said transfer devices are recirculating ball nuts.

6. In a rotary to linear differential device; a pair of screw shafts; support means rotatably mounting the screw shafts parallel to each other and preventing axial movement of the screw shafts; input means for rotating each of the screw shafts; and an output carriage assembly mounted on the screw shafts for movement axially of the screw shafts including; screw shaft engaging devices engaging each of said screw shafts, said engaging devices being moved linearly and parallel to said screw shafts whenever there is a relative speed difference between the engaging devices and the screw shafts, and gear means carried by each of said engaging devices and in mesh with each other so that any rotative speed difference between the screw shafts causes a relative speed difference between each of said engaging devices and said screw shafts to move the carriage assembly.

7. In the rotary to liner differential device set forth in claim 6, wherein said screw shafts are ball nut screw shafts and said screw shaft engaging devices are recirculating ball nuts.

8. In a rotary to linear differential device; a pair of parallel shafts; support means rotatably supporting said shafts; input means for rotating each of the shafts; transfer means on each said shaft; and a carirage assembly mounted on said transfer means for unitary movement parallel to the shafts; one of said shafts having first means operative to move the transfer means on said one shaft in a direction parallel to said one shaft whenever there is a relative speed difference between said one shaft and the transfer means on said one shaft, the other of said shafts having second means operative to move the transfer means on said other shaft in a direction parallel to said other shaft whenever there is a relative speed difference between said other shaft and the transfer means on said other shaft, and gear means operatively interconnecting said transfer means so that any rotative speed difference between the shafts causes a relative speed difference between each of said transfer means and said shafts to move the carriage assembly.

9. In a rotary to linear differential device; a pair of ball nut screw shafts; support means rotatably mounting the screw shafts adjacent and parallel to each other and preventing axial movement of the screw shafts; input means for rotating each of the screw shafts; and an output carriage assembly mounted on the screw shafts for movement axially of the screw shafts including; a casing member having a pair of bearings, recirculating ball nut means rotatably mounted and retained in each of said bearings and carried by each of said screw shafts, said nut means being axially moved along the screw shafts whenever there is a relative speed difference between the nut means and the screw shafts, and gear means carried by each of said nut means and in mesh with each other so that any rotative speed difference between the screw shafts causes a relative speed difference between each of said nut means and said screw shafts to move the carriage assembly.

10. In a rotary to linear differential device; a pair of elongated ball nut screw shafts; support means including antifriction devices rotatably mounting the screw shafts adjacent and parallel to each other and preventing axial movement of the screw shafts; input means for rotating each of the screw shafts; and an output carriage assembly mounted on the screw shafts for movement axially of the screw shafts including; a casing member having a pair of bearings, said bearings having an outer race and an inner race with antifriction means positioned therebetween, said outer race of each said bearings being secured to said casing member, recirculating ball nut means carried by each of said screw shafts and having a bearing flange member secured to said inner race of each said bearings, said nut means being axially moved along the screw shafts whenever there is a relative speed difference between the nut means and the screw shafts, first gear means fixed to one of said nut means, second gear means fixed to the other of said nut means, said first and second gear means in mesh with each other so that any rotative speed difference between the screw shafts causes a relative speed difference between each of said nut means and said screw shafts to move the carriage assembly.

11. In the device set forth in claim 10, wherein each said bearing flange member is a cylindrical shaped recirculating ball nut mounted on each said screw shaft and secured to each said recirculating ball nut means to preload each said cylindrical shaped recirculating ball nut and recirculating ball nut means to prevent backlash.

12. In a device for converting the relative speed difference of two rotating shafts into a proportional linear velocity; support means rotatably supporting a pair of parallel elongated screw shafts and preventing axial movement thereof; input means for rotating each of the screw shafts; and output means mounted on the screw shafts for movement axially of the screw shafts including; rotatably mounted antifriction engaging means engaging said screw shafts and being axially moved along the screw shafts whenever there is a relative speed difference between said antifriction engaging means and the screw shafts, and gear means operatively connecting said antifriction engaging means so that any rotative speed difference between the screw shafts causes a relative speed difference between each of said antifriction engaging means and said screw shafts to move the output means.

13. In a device for converting the relative speed difference of two rotating shafts into a proportional linear velocity; support means rotatably supporting a screw shaft and a second shaft; the screw shaft and second shaft being arranged adjacent and parallel to each other; input means for rotating each of said shafts; and a carriage assembly mounted on the screw shaft and movable in a direction axially of the screw shaft including; a screw shaft engaging device having a first gear member, said engaging device engaging said screw shaft and axially moved there along whenever there is a relative speed difference between said engaging device and the screw shaft, a second gear member rotatably supported and retained by said output member and having means operatively connected to said second shaft, said first and second gear members in mesh with each other so that any rotative speed difference between the screw shaft and the second shaft causes a speed difference between said engaging device and said screw shaft to move said carriage assembly.

14. In the device set forth in claim 13, wherein said screw shaft is a ball nut screw shaft and said screw shaft engaging device is a recirculating ball nut.

15. In a device for converting the relative speed difference of two rotating shafts into a proportional linear velocity; support means rotatably supporting a screw shaft and a second shaft; said screw shaft and second shaft being arranged adjacent and parallel to each other; input means for rotating each of said shafts; and a carriage assembly mounted on the screw shaft and movable in a direction axially of the screw shaft including; antifriction engaging means engaging said screw shaft and being axially moved along the screw shaft whenever there is a relative speed difference between the antifriction engaging means and the screw shaft, and gear means rotatably supported by said carriage assembly, said gear means comprising a first gear fixed for rotation with said antifriction engaging means and a second gear having means operatively connected to said second shaft, said first and second gears in mesh with each other so that any rotative speed difference between said screw shaft and said second shaft causes a speed difference between said antifriction engaging means and said screw shaft to move said carriage assembly.

16. In the device set forth in claim 15, wherein said screw shaft is a ball nut screw shaft and said antifriction means is a recirculating ball nut.

References Cited in the file of this patent

UNITED STATES PATENTS

| | | |
|---|---|---|
| 2,905,011 | Armstrong et al. | Sept. 22, 1959 |
| 2,907,219 | Orner | Oct. 6, 1959 |